United States Patent
Colby et al.

(10) Patent No.: US 9,168,613 B2
(45) Date of Patent: Oct. 27, 2015

(54) VERTICAL LASER CLADDING SYSTEM

(75) Inventors: Paul T. Colby, Incline Village, NV (US); David Hotchkiss, Oconomowoc, WI (US); James W. Sears, Rapid City, SD (US); Joshua J. Hammell, Evansville, WY (US); James L. Tomich, Eden, WY (US)

(73) Assignee: Paul T. Colby, Incline Village, NV (US)

( * ) Notice: Subject to any disclaimer, the term of this patent is extended or adjusted under 35 U.S.C. 154(b) by 682 days.

(21) Appl. No.: 13/274,655

(22) Filed: Oct. 17, 2011

(65) Prior Publication Data
US 2012/0100313 A1 Apr. 26, 2012

Related U.S. Application Data

(60) Provisional application No. 61/405,747, filed on Oct. 22, 2010.

(51) Int. Cl.
| | |
|---|---|
| *B23K 26/34* | (2014.01) |
| *B23K 26/08* | (2014.01) |
| *B23K 26/14* | (2014.01) |
| *B23K 26/30* | (2014.01) |
| *B23P 6/00* | (2006.01) |
| *B23K 26/32* | (2014.01) |
| *B23K 35/02* | (2006.01) |

(52) U.S. Cl.
CPC ............. *B23K 26/34* (2013.01); *B23K 26/0823* (2013.01); *B23K 26/0869* (2013.01); *B23K 26/1405* (2013.01); *B23K 26/3206* (2013.01); *B23K 26/3293* (2013.01); *B23K 26/421* (2013.01); *B23K 26/422* (2013.01); *B23K 35/0244* (2013.01); *B23P 6/00* (2013.01); *B23K 2201/06* (2013.01); *B23K 2201/12* (2013.01); *B23K 2201/34* (2013.01); *B23K 2203/04* (2013.01)

(58) Field of Classification Search
None
See application file for complete search history.

(56) References Cited

U.S. PATENT DOCUMENTS

| | | | |
|---|---|---|---|
| 3,277,529 | A | 10/1966 | Linder |
| 3,383,491 | A | 5/1968 | Muncheryan |
| 3,585,350 | A | 6/1971 | Voytko |
| 3,596,050 | A | 7/1971 | Tikijian |
| 3,742,182 | A | 6/1973 | Saunders |
| 3,804,382 | A | 6/1974 | Pultz |

(Continued)

FOREIGN PATENT DOCUMENTS

| | | |
|---|---|---|
| CN | 101722403 | 6/2010 |
| DE | 37 34 328 | 11/1988 |

(Continued)

OTHER PUBLICATIONS

Hirano et al., "Development of Laser Surface Cladding with Energy Transmission in Optical Fiber", IHI Engineering review, vol. 24, No. 1, Jan. 1991.*

(Continued)

*Primary Examiner* — Joel Horning
(74) *Attorney, Agent, or Firm* — Roth Blair Roberts Strasfeld & Lodge (57) ABSTRACT

A vertical laser cladding system is particularly effective for the interior surfaces of tube-like structures. The vertical cladding process works from bottom to top, so that previously clad layers form a shelf for subsequent application of cladding powder. This system is also particularly effective for handling double-bore plasticating barrels.

9 Claims, 3 Drawing Sheets

(56) References Cited

U.S. PATENT DOCUMENTS

| | | | |
|---|---|---|---|
| 3,949,186 A | 4/1976 | Nakayama et al. |
| 3,952,180 A | 4/1976 | Gnanamuthu |
| 4,028,027 A | 6/1977 | Worz |
| 4,088,865 A | 5/1978 | Peters et al. |
| 4,153,490 A | 5/1979 | Werz et al. |
| 4,167,662 A | 9/1979 | Steen |
| 4,298,784 A | 11/1981 | Schmall |
| 4,330,699 A | 5/1982 | Farrow |
| 4,367,017 A | 1/1983 | Jimbou et al. |
| 4,489,140 A | 12/1984 | Pulliam et al. |
| 4,532,191 A | 7/1985 | Humphries et al. |
| 4,590,033 A | 5/1986 | Chapet |
| 4,596,282 A | 6/1986 | Maddy et al. |
| 4,599,783 A | 7/1986 | Ceccacci |
| 4,663,511 A | 5/1987 | Tallman |
| 4,665,294 A | 5/1987 | Hira et al. |
| 4,694,136 A | 9/1987 | Kasner et al. |
| 4,772,773 A | 9/1988 | Hashimoto et al. |
| 4,781,770 A | 11/1988 | Kar |
| 4,787,736 A | 11/1988 | Mori et al. |
| 4,803,334 A | 2/1989 | Burke et al. |
| 4,835,357 A | 5/1989 | Schalk |
| 4,847,112 A | 7/1989 | Halleux |
| 4,863,661 A | 9/1989 | Maddy |
| 4,877,939 A | 10/1989 | Duley et al. |
| 4,942,059 A | 7/1990 | Wilson |
| 5,019,459 A | 5/1991 | Chou et al. |
| 5,060,842 A | 10/1991 | Qureshi et al. |
| 5,066,846 A | 11/1991 | Pirl |
| 5,111,021 A | 5/1992 | Jolys et al. |
| 5,147,999 A | 9/1992 | Dekumbis et al. |
| 5,155,325 A | 10/1992 | McCleaf et al. |
| 5,155,329 A | 10/1992 | Terada et al. |
| 5,179,260 A | 1/1993 | Kroehnert |
| 5,182,429 A | 1/1993 | Pirl et al. |
| 5,182,430 A | 1/1993 | Lagain |
| 5,196,272 A | 3/1993 | Morishige et al. |
| 5,196,671 A | 3/1993 | Kroehnert |
| 5,229,571 A | 7/1993 | Neiheisel |
| 5,231,261 A | 7/1993 | Duthoo |
| 5,242,438 A | 9/1993 | Saadatmanesh et al. |
| 5,359,172 A | 10/1994 | Kozak et al. |
| 5,371,767 A | 12/1994 | Pirl |
| 5,387,292 A | 2/1995 | Morishige et al. |
| 5,418,625 A | 5/1995 | Shimoosawa |
| 5,426,278 A | 6/1995 | Hirano et al. |
| 5,428,280 A | 6/1995 | Schmidt et al. |
| 5,430,270 A | 7/1995 | Findlan et al. |
| 5,478,983 A | 12/1995 | Rancourt |
| 5,491,317 A | 2/1996 | Pirl |
| 5,495,090 A | 2/1996 | Mukai et al. |
| 5,496,422 A | 3/1996 | Morishige et al. |
| 5,565,277 A | 10/1996 | Cox, Jr. et al. |
| 5,653,897 A | 8/1997 | Findlan et al. |
| 5,656,185 A | 8/1997 | Findlan et al. |
| 5,667,706 A * | 9/1997 | Pirl et al. | 219/121.64 |
| 5,728,992 A | 3/1998 | Swidwa |
| 5,752,770 A | 5/1998 | Kawaguchi et al. |
| 5,816,698 A | 10/1998 | Durina et al. |
| 5,977,513 A | 11/1999 | Findlan |
| 5,994,664 A | 11/1999 | Anderton et al. |
| 6,171,415 B1 | 1/2001 | Statnikov |
| 6,238,733 B1 | 5/2001 | Therolf |
| 6,303,897 B1 * | 10/2001 | Bady et al. | 219/121.65 |
| 6,316,744 B1 | 11/2001 | Nowotny et al. |
| 6,486,432 B1 | 11/2002 | Colby et al. |
| 6,548,125 B2 | 4/2003 | Warnecke |
| 6,818,857 B1 | 11/2004 | Cho et al. |
| 6,843,866 B2 * | 1/2005 | Brenner et al. | 148/525 |
| 6,858,262 B2 | 2/2005 | Fischer et al. |
| 6,881,451 B2 | 4/2005 | Heinemann et al. |
| 6,906,281 B2 | 6/2005 | Musselman |
| 6,942,426 B1 | 9/2005 | Kampbell |
| 2005/0109818 A1 | 5/2005 | Shimohata et al. |
| 2007/0056939 A1 | 3/2007 | Colby et al. |
| 2007/0071907 A1 | 3/2007 | Stiles et al. |
| 2009/0291197 A1 | 11/2009 | Bartels |

FOREIGN PATENT DOCUMENTS

| | | | |
|---|---|---|---|
| DE | 37 40 916 | 6/1989 | |
| DE | 42 26 768 | 2/1994 | |
| EP | 1215033 | * 6/2002 | ............ B29C 47/66 |
| JP | 01104487 | 4/1989 | |
| JP | 2008188648 A | * 8/2008 | |

OTHER PUBLICATIONS

Office Action filed by the State Intellectual Property Office of the People's Republic of China, dated Jul. 31, 2014, having Application No. CN201180050737.9.
2004 Correlation Between Melt Pool Temp . . . (S. Sun, et al.).
2004 Ytterbium-doped large-core iber laser . . . (Y. Jeong, et al.).
1998 Continuous-wave operation . . . (Shuji Nakamura, et al.).
1997 Room-Temperature continuous-wave . . . (Shuji Nakamura, et al.).
1996 Room-Temperature continuous-wave . . . ( Shuji Nakamura, et al.).
1997 RT-CW Operation of InGaN . . . (Shuji Nakamura, et al.).
1998 Laser cladding . . . (R. Vilar, et al.).
Laser cladding . . . (Stork Gears & Services).
2010 iClad Welding services . . . (iClad Welding Services LLC).
2010 On-Site Surface Protection Solutions . . . (Integrated Global Services, LLC).
2010 System Engineering for Power-Based Laser Cladding (Fraunhofer).
2011 Lasercarb . . . (Technogenia Lasercarb Technology Center) http://www.technogeniausa.com.
2011 Welding . . . (Joining Technologies) http://www.joiningtech.com/pages/welding.html.
2011 Cladding/Additive . . . (Joining Technologies) http://www.joiningtech.com/pages/cladding.html.
2011 Cutting . . . (Joining Technologies) http://www.joiningtech.com/pages/cutting.html.
2011 Complete System . . . (Joining Technologies) http://joiningtech.com/infiniteweb/.
2011 JTRC . . . (Joining Technologies) http://www.joiningtech.com/jtrc/index.html.
2011 Press Release . . . (Rofin Sinar) http://www.rofin.com/en/press_releases/details/?tx_ttnews%5D=535&tx_ttnews%5BbackPid%5D=737&cHash=3692930cc18069aedd353de65as063b.
2011 Coating and Laser Application . . . (Fraunhofer USA) http://www.fraunhofer.org/CoatingsandLaserApplications.
2011 Laser Technology . . . (Fraunhofer USA)http://www.Fraunhofer.org/LaserTechnology.
IHI's Material Processing Technology for in Si-Tu Repair by Nuclear & Chemical component Works.
1996 Tig Cladding Technology in IHI.
Development of Laser Surface Cladding with Energy Transmission in Optical Fiber by IHI Engineering Review vol. 24 No. 1, Jan. 1991.
1994 Developing of Laser Surface Cladding with Energy Transmission through Optical Fiber.
Plasticating components Technology by Spirex.
1987 The Journal of Medals "High-Power Laser Beam Cladding".

* cited by examiner

VERTICAL LASER CLADDING SYSTEM

PRIORITY INFORMATION

The present invention claims priority to U.S. Provisional Application No. 61/405,747 filed on Oct. 22, 2010, and makes reference herein to same in its entirety.

FIELD OF INVENTION

The present invention relates generally to the field of laser cladding of components, such as tubes and barrels, on irregular surfaces used in a variety of different applications. In particular, the present invention is directed to a method and system for cladding or repairing the interiors of tube-like structure, especially those with smaller diameters.

BACKGROUND ART

The lining, protecting, or repair of the interior of tubes or tube-like structures has been a desirable expedient ever since tubes began to be subject to high stress applications. Some examples have been the use of tubes in hot water heaters, steam engines or steam generators. However, there are many other applications for the cladding and/or repair of tube-like structures. These would include fire arms, hydraulic pistons and the like. Further, cladding and surface repair can be used for a wide variety of exterior and irregular surfaces, such as those that would interact with hydraulic pistons and the like. Repair of special surfaces, such as chrome, is another potential use for cladding. Another application would be for plasticating tubes or barrels which often must endure substantial stresses or exposure to degrading substances.

Because of the temperatures and duty cycles involved in many of these applications, many metallic tube materials are rapidly degraded so that tube deterioration or non-functionality requires replacement of the tubes in question. When tube-like structures were sufficiently large, special metallic liners could be inserted to increase the operating life of the tube and to enhance functionality. However, as tubes grew ever smaller for a certain functions, the insertion of linings became more difficult.

Cladding the interior of a tube provided a much stronger and more durable interior surface than many external liner inserts could provide, and so became very popular for relatively large tubes that would be subject to high stress applications, such as plasticating barrels. A major problem with arc cladding or oxy acetylene torch cladding is that the surface developed thereby is extremely rough and irregular, requiring substantial machining (clean-up) to render the surface thickness sufficiently uniform and smooth for many uses.

Also, as tube sizes decreased, traditional arc or torch cladding became impossible. Conventionally, this meant that tube liners could be formed only near the two ends of the tube. Consequently, for many applications, cladding the interior of tubes was not an option.

This situation has been addressed to a large extent by the use of centrifugal casting to clad the interior of tubes. However, certain problems remained, especially with respect to plasticating barrels having relatively small diameters.

Extruders and tubers (rubber extruders) for high stress plasticating and plastic extrusion have been in use at least since the beginning of the twentieth century. With the vastly increasing use of plastics in the last half century, the demand for such extruders has become substantially greater, and the processing conditions have become far more severe. Originally plasticating devices were essentially a simple screw rotating inside a single-material barrel without a lining. This is no longer the case due to the more complex and corrosive materials being processed and the need for plasticating barrels having smaller diameters.

Both the barrel and screw of plasticating barrels are subject to wear from metal-to-metal contact and from abrasive and/or corrosive fillers in the plastic or rubber compounds. The earlier barrels had an internal surface that was nitrided to give improved abrasive wear resistance. In the later 1950's, bimetallic barrels were developed using a centrifugal casting process, as briefly described in the attached Spirex publication, entitled *Plasticating Components Technology*, 1997, incorporated herein by reference. Also, such improved barrels were adapted for use with injection molding machines in addition to conventional plastic extruder systems.

Centrifugal casting of plasticating barrels is a process used to line the internal surface of a barrel with an abrasion and/or corrosion resistant liner that is different from the barrel backing material or substrate. The process involves adding a lining material, such as a powder, inside the heavy-walled barrel cylinder at room temperature. The ends of the barrel are capped (usually cladded), and the barrel and unmelted powder are placed in a casting oven. The barrel is then rotated and heated until the liner materials are melted and uniformly distributed on the internal surface of the barrel. Early liner materials were iron/boron materials that created some metal carbides and were very much more wear resistant than conventional nitrited barrels. In 1968, improved liners became more abrasion resistant by the addition of very small, discrete metal carbide particles like tungsten carbide and/or equivalent materials.

Most rotational casting ovens are gas heated, but some are induction heated. In either case, the inside of the barrel must be heated to a point where the liner powder melts, but the thick-walled barrel material or substrate does not melt. After melting the powder is accomplished, the barrel is slowly cooled by radiation of the furnace heat into the surrounding environment, so that stresses are not induced and so that the liner material does not crack. After cooling, the barrel is honed, straightened, and machined to its final configuration and dimensions. There are a number of disadvantages to these techniques.

For example, often this process requires installation of a high-pressure sleeve at the discharge end of the barrel. Furnaces configured for rotating equipment are very expensive and require extensive maintenance. This includes periodic and prolonged shutdowns to reline the refractory surfaces of the oven and refurbish the rotating machinery. Further, even when the furnaces are functioning properly, set up for the coating of each barrel is an awkward and time-consuming process.

Also, the process of centrifugal coating requires that the liner material, or material matrix, melt at a lower temperature than the backing or substrate material. This creates severe limitations on the liner materials that can be used. As a result, abrasion-resistant and corrosion-resistant materials are limited to formulas that melt at a lower temperature than the barrel substrate. In many cases the optimum barrel substrate and liner materials preferred for the materials to be handled, cannot be used together. There is also the requirement of raising the backing or substrate material to a temperature close to its melting point, followed by a slow cooling to anneal the backing material to the liner material. This lowers the strength of the annealed backing material. Unfortunately, very high strengths are now required for many high stress applications, such as plasticating barrels. Such barrels can be subject to internal pressures of 40,000 psi or higher, and temperatures up to 700° F. These conditions often require the installation of a high pressure sleeve at considerable expense. Some newer, higher priced alloys can reduce this effect somewhat by reducing the loss of strength. However, greater expense is incurred, including greater processing times and more complex manufacturing facilities.

During the rotational casting process to form a barrel lining, the heavier metal carbide particles tend to be thrown outward by centrifugal force. This moves these particles away from the inside surface where they are needed for abrasion resistance. As a result, the resulting lining is far more susceptible to wear caused by abrasion than if the metal carbide particles are properly located on or very near the inner surface of the lining, or evenly distributed throughout the thickness of the lining or cladding.

Further, the high barrel temperatures that are reached during centrifugal casting make it difficult to maintain the barrel straightness and integrity, which are critical to the subsequent plastic processing operation. Straightening of the barrel cannot be done by conventional straightening presses because reverse bending cracks the relatively brittle liner. The rotational casting process requires a long time to heat up the liner and barrel substrate. Additional time is required for slow cooling (by radiating heat into the environment) after the lining operation. This causes added expense in labor and electrical costs.

Because a centrifugal lining process can only be successful in a very narrow range of processing times and temperatures, the results are often not satisfactory. High temperatures and long time periods spent at these temperatures cause dilution by migration of the substrate material into the barrel lining material or matrix. This causes reduced hardness and poor abrasion resistance. Also substrate migration of the base iron material can cause poor corrosion resistance in certain applications. Extended periods at high temperatures also cause the metal carbide particles coating the inner surface of the liner to melt into solution in the matrix matter (constituting the liner), rendering the carbide particles useless for anti-abrasion purposes.

When temperatures are too low and the time periods at proper processing temperatures are too short, an inadequate bond can result. Such an inadequate bond means that the liner may become separated from the barrel substrate or backing material. This condition could render the entire barrel useless for any purpose. Further, in some cases, portions of the liner may come dislodged, corrupting the molten plastic and/or fouling the screw pushing the molten plastic through the barrel. In either case, the barrel is subject to major failure, and the plastic processed therein ruined.

Even if the lined tube or barrel is not going to be used in plasticating applications, the dislodging of the liner with respect to the base material can prove problematic. For example, in boiler applications the base material of the tube could be prematurely corroded. Liquid running through the tube may be hindered to the point that essential heat transfer properties are compromised, and loose liner material could be stripped away, corrupting the overall water carrying system. Clearly, for these type applications, a strong metallurgical bond is needed and cannot be compromised.

Conventional MIG or TIG cladding of the inside diameter (ID) of barrels can be done to form metallurgical bonds, but it is more difficult to get such cladding heads into smaller diameter barrels. The area affected by heat is much greater than for laser cladding, and the cladded surface is poorer than that resulting from laser cladding. This results in far greater expense for post-clad finishing compared to the "near-net shape" of laser-cladding.

A totally different method to produce barrel liners is constituted by laser cladding. More specifically, laser cladding can bond liner material onto a base or substrate metal, forming a stable metallurgical bond. This new process diminishes or eliminates all of the disadvantages listed above, but has certain disadvantages of its own.

Laser cladding of the interior diameter (ID) of barrels, or other tube-like structures, involves the depositing of a liner material in the form of paste, or a separate liner tube, prior to cladding or during the cladding process. In the alternative, a powder or continuous wire can be applied. The laser cladding system is usually constituted by a laser beam delivered from a remote source via fiber optics and optical systems, or by a direct laser beam.

This technique has a number of clear advantages. For example, devices have been made that will allow laser cladding of tube diameters as small as 1 inch. Laser cladding also has a very shallow heat-affected depth which gives much less dilution of the liner material into the barrel substrate. This technique also creates much less stress in the substrate, reducing the tendency to bend or warp. Laser cladding also allows for a much more rapid cooling process since much less of the substrate of the barrel or tube has been heated to cladding temperatures. Rapid cooling has substantial advantages in overall manufacturing efficiency. However, rapid cooling can lead to difficulties under certain circumstances, as explained infra.

Laser cladding is a relatively robust process that allows a wide variety of material to be used, including materials that melt at higher temperatures than the barrel substrate. This can allow the use of improved matrix materials and improved ceramic or carbide materials as anti-abrasive coatings on the liner. Discrete abrasion resistant carbide or ceramic particles do not migrate toward the substrate as in a rotational casting. This leaves them more evenly distributed near the surface of the liner, where they are needed.

Further, the substrate does not necessarily need to be preheated prior to laser cladding, thus reducing production time and expense. Heat imparted by the laser cladding process is much more localized and can be quickly removed during the cladding process by a variety of internal and external methods. This means that a long cooling time can be eliminated. As a result, this cladding process is far less time-consuming than centrifugal casting.

Laser cladding is a process with a metallurgical bond, rather than a brazing process where the liner melts at a lower temperature than the substrate (to form a mechanical bond) as in rotational furnace casting. The laser cladding equipment is generally lower in cost than gas-fired or induction furnaces needed to contain the entire barrel and rotational equipment. Laser cladding is somewhat different than laser welding in that there is usually less than 2% dilution (migration between the liner material and the base material), but still sufficient to form a metallurgical bond. In contrast, welding is usually more than 5% or even 10% dilution of the weld matrix by migration from the base material. In certain applications, such as plasticating barrels, a true weld would be inappropriate because of the higher levels of migration or dilution. Only true cladding (generally less than a 2% dilution rate) is appropriate.

Several systems for laser cladding of the inside of pipes have been invented and commercialized. These include EPRI Patent Nos. 5,653,897 and 5,656,185 and IHI Patent No. 5,426,278. Also included are U.S. Pat. Nos. 5,496,422; 5,196,272; and, 5,387,292. All of the aforementioned patents are incorporated herein by reference to facilitate a better understanding of the present invention. These devices are designed to repair damaged or corroded heat exchanger tubes in power generation plants. More specifically, these systems are designed to make short, localized repairs in relatively long, fixed pipes that cannot rotate.

To accomplish cladding, each of these systems uses a rotating laser head. The systems described in the aforementioned patents include the insertion of a cladding or inlay material by wire, powder, paste, or thin wall tube. The paste and the tubes are already in place before laser cladding. In the case of the EPRI patents, a coiled wire is placed inside the pipe directly above the repair area in order to have it easily accessible and easy to feed as the cladding proceeds. This method is limited to short longitudinal lengths of clads, as are generally required in boiler repair. Powder is difficult to introduce in the horizontal position because, without gravity assist, it tends to clog and interrupts cladding. Drawings of these various cladding systems are shown in the respective patents.

For prolonged or full length cladding of 20:1 (length-to-diameter) or longer pipes, tubes, and barrels, the cladding head, and especially the reflecting mirrors associated with it, must be cooled. This can be done by a cooling fluid such as air or water. The EPRI patent does not have such cooling except for the bearings that are required to rotate the head inside the pipe. The IHI device allows cooling (by air) coming from the direction of the laser source.

All of the aforementioned systems must have extensive auxiliary services introduced from the laser head end of the tube because access from the opposite end is not available and cannot be coordinated with the activity provided from the laser end. These auxiliary services can include fiber optical viewer, wire/powder feeds, cooling media, optics (lenses) and focusing devices.

There is also a need to make such devices ever smaller. In particular, barrel IDs as small as 14 mm (0.551 inch) are used for plasticating barrels. Thus, appropriate cladding devices are necessary to clad or line the interior of the plasticating barrels. Conventional rotating cladding devices operate entirely from one end of the tube being lined or cladded. Consequently, size reduction for such cladding devices is severely limited. This is particularly true since the cladding head must include all auxiliary services, as well as the bearings required for rapid rotation of the cladding head. This entire structure is fed into the tube to be cladded from only one side of the tube. As a result, size reduction of the overall cladding apparatus is very problematical, and cannot accommodate some smaller sizes used for plasticating barrels.

The aforementioned difficulties in conventional systems, the inability to produce smooth, uniform linings for plasticating barrels has been addressed in large part by the systems disclosed in U.S. Pat. No. 6,486,432 to Colby et al., issued Nov. 26, 2002, and incorporated herein by reference in its entirety. This patent provides a wide variety of different approaches to obtaining smooth, uniform linings in tubular structures such as plasticating barrels.

However, there are number of drawbacks that still exist. For example, in a horizontally-positioned tube, smoke and debris tend to accumulate due to the force of gravity, especially if the tube is long and the cladding head, rather than the tube, is moving. This accumulation of smoke and debris compromises the speed of the cladding process, results in wasted cladding powder, and even degrades the cladding due to accumulated debris, which can occur even in a spinning tube. Also, in horizontally aligned tubes, the best cladding angles can sometimes be hard to obtain, thereby resulting in lost energy and a slower cladding process. Reflection of laser energy from the smooth, cladded surface that is the object of laser cladding, can also damage equipment as well as waste energy.

Carbide particles are often added to the clad to present a very hard, anti-abrasive surface that is necessary with many of the materials being processed in plasticating screws. Unfortunately, conventional cladding techniques permit migration of these carbide particles from the surface of the clad to positions deeper in the clad, where the particles are far less effective. Also, conventional cladding techniques usually result in the loss of many of the carbide particles used in the process, thereby entailing substantial unnecessary expense. Particles within conventional clads also necessitate that substantial post-clad finishing or polishing techniques be used. Such techniques can be very extensive in nature and can greatly raise the price and complexity of the overall manufacturing process. It is important to note that the extent of post-clad machining or polishing (to smooth and obtain uniform liner thickness) is a major operational factor in the lining of tubes and barrels, especially plasticating barrels.

Also, there is the well-known problem of cracked laser clads due to overly-rapid cooling or uneven cooling. This is not addressed in the examples of conventional art, and can be a major problem with laser cladding, depending upon the types of materials used in the cladding process. Further, the well-known difficulties of addressing multi-bore plasticating barrels still exist with the conventional systems.

Accordingly, an improved laser cladding system for barrels, tube-like structures, and other surfaces would address all of the aforementioned drawbacks of conventional systems while providing smooth, uniform linings for even small diameter barrels. The improved laser cladding system would also provide a capability for efficiently cladding double-bore barrel configurations, and providing a repair system for a wide variety of surfaces and materials, such as chrome plating.

SUMMARY OF THE INVENTION

It is a primary object of the present invention to overcome, or otherwise mitigate, the drawbacks of the conventional art of laser cladding and centrifugal cladding.

It is another object of the present invention to provide a system for cladding inside surfaces that is sufficiently flexible so that a wide variety of tube sizes and cladding materials can be accommodated.

It is an additional object of the present invention to provide a system for lining inside diameters of tubes in which a more uniform lining can be achieved than is possible with existing cladding techniques.

It is again a further object of the present invention to provide a system for lining of interior surfaces in which smoothing techniques operate in a uniform manner on each of the clads constituting the cladding of the plasticating barrel.

It is still another object of the present invention to provide a system for laser cladding the interior of a metal tube, wherein the system is relatively simple to set up and operate compared to conventional systems.

It is again a further object of the present invention to provide a process for laser cladding the interior of a metal tube, permitting reduced operating time.

It is still another object of the present invention to provide a system for quickly and easily repairing and lining metal tubes at substantially lower costs than those incurred with conventional systems.

It is again a further object of the present invention to provide a system for lining the interior of the metal tube by laser cladding wherein the conventional necessity of a rotating laser head can be avoided.

It is yet another object of the present invention to provide a system for lining a metal tube using laser cladding in which movement of the cladding head is required only along the axis of the tube being cladded.

It is again a further object of the present invention to line a metal tube using laser cladding to which an anti-abrasive material is added so that the anti-abrasive material remains uniformly distributed on or near the surface of the laser clads.

It is yet another object of the present invention to provide a smoother, pre-machined clad than is obtainable from conventional cladding techniques, in particular, MIG and TIG methods.

It is still a further object of the present invention to provide a laser cladding system in which post-clad machining is minimized.

It is yet another object of the present invention to provide a method of uniformly precoating an accurate amount of material on an interior surface to facilitate cladding operations thereon.

It is still a further object of the present invention to provide a cladding system for precisely placing a uniform pattern of anti-abrasive material in a clad melt without melting or otherwise degrading the anti-abrasive material.

It is yet another object of the present invention to facilitate faster, pre-clad set up of tubes and barrels.

It is again a further object of the present invention to provide a laser cladding system in which cracking due to overly rapid cooling can be avoided.

It is again a further object of the present invention to provide a cladding system that facilitates the manufacturing and cladding of plasticating barrels having double bores.

It is yet another object of the present invention to provide a cladding system in which wasted cladding powder is substantially reduced.

It is still another object of the present invention to provide a cladding system in which accumulated debris, smoke, and the like are easily evacuated from a tube being cladded.

It is another object of the present invention to provide a cladding system in which optimum cladding angles can easily be obtained to facilitate increased cladding efficiency.

It is still a further object of the present invention to provide a laser cladding system in which damage to the cladding head from reflected energy is avoided.

It is again another object of the present invention to provide a cladding system in which unused cladding powder can easily be retrieved.

It is a further object of the present invention to provide a cladding system in which the contour of existing clads can be used to facilitate the smooth accurate production of adjacent clads.

It is still a further object of the present invention to provide a cladding system that results in a product requiring less cleanup (evening of the surface thickness) and less honing to achieve a smooth finish.

It is yet another object of the present invention to provide a cladding system capable of effecting superior repairs to a wide variety of different surfaces, including those having anti-abrasive materials, so that there is near identity of the repaired portion with the original cladding.

It is again an additional object of the present invention to provide a laser cladding system capable of controlling the migration of the base material with the welding material, while establishing a true metallurgical bond.

These and other goals and objects of the present invention are achieved by a laser cladding system arranged for cladding the interior of a metal tube-like structure where the cladding system includes a subsystem for holding and rotating the tube-like structure at a predetermined speed and a predetermined non-horizontal angle. A cladding head is arranged to irradiate an internal surface of the tube-like structure at a predetermined non-perpendicular angle to the internal side of the tube-like structure. Also included is a translating system for moving the laser cladding head from the bottom to the top of the tube-like structure.

Another embodiment of the present invention includes a method of cladding the interior of a tube-like structure. This method includes the steps of placing the tube-like structure in a non-horizontal position and rotating the tube-like structure at a predetermined speed. Then the interior surface of the tube-like structure is irradiated downward from a moving laser head at a non-normal angle to the interior surface of the tube-like structure. Finally, the laser cladding head is moved from proximate the bottom opening of the tube-like structure upward to proximate the top opening of the tube-like structure.

Yet another embodiment of the present invention includes a method of manufacturing a double barrel structure with a clad interior, the double barrel structure preferably has two overlapping cylindrical bores in a single piece of solid substrate stock. In the manufacturing process, radial laser cladding is conducted in each of the bores from the bottom to the top of each bore, and linear cladding is conducted from the bottom to the top of each of the apices between the overlapping bores.

DETAILED DESCRIPTION OF THE PREFERRED EMBODIMENTS

Figure 1:
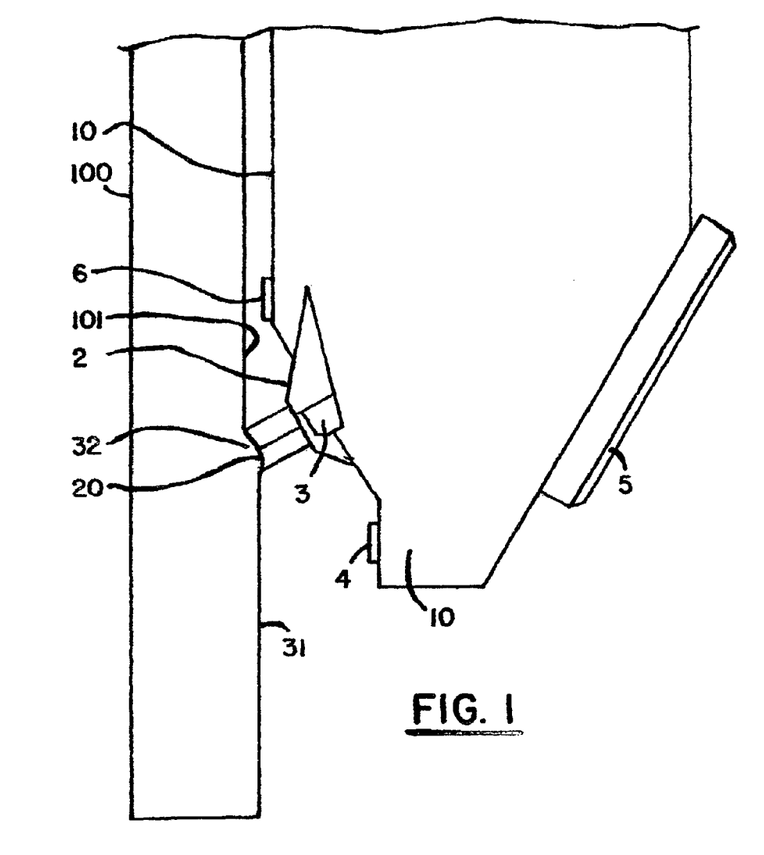
FIG. 1 is a side view schematic diagram depicting the laser-clad head of the present invention arranged in a tube.

The first embodiment of the present invention is depicted in FIG. 1. Cladding head 10 is depicted as being within the interior of tube 100. The laser head 2 (part of cladding head 10) directs laser beam 20 against an interior surface 101 of tube 100. Cladding nozzle 3 is associated with the laser head 2, and functions to provide cladding powder to the precise irradiation site to form the cladding layer 30 on the interior surface 101 of tube 100.

During the cladding process, distance sensor 6 determines the correct distance between the laser head 2 and the surface 101. The data from distance sensor 6 permits adjustment in the cladding head 10 (including distance, power, and other cladding parameters) to maintain or adjust clad characteristics, thereby achieving the desired results. After the cladding occurs, cladding thickness sensor 4 determines if the cladding layer 30 is within acceptable tolerances. Mirror 5 serves to protect the portion of the cladding head 10 from radiated energy that might otherwise damage the cladding head 10.

It is important to note that cladding head 10 moves from the bottom of tube 100 upwards towards the top of tube 100 during the cladding process, and that tube 100 is in a vertical position. Tube 100 is held in a vertical position in a manner so that it can be rotated at high speeds. Any number of different motivating and holding arrangements can be used to effect the rotation of tube 100. Some examples are found in the attached Appendix and depicted schematically in FIG. 4.

Preferably, systems of the present invention operate at speeds from 2 revolutions per minute (hereinafter "rpm") up to 50 rpm. The system of the present invention uses a laser beam having a width of approximately ⅛ inch. The combination of these speeds with the characteristics of the inventive vertical cladding arrangement means that the difference between the peaks and valleys is always going to be less than ¹⁄₁₀₀ inch. The result is less post-cladding machining than with conventional systems.

The cladding is effected by irradiation from a laser beam 20 to form a continuous spiral clad line or bead 31 from the bottom to the top of tube 100. The spiral bead 31 forming the clad is created by a laser operating between ½ and 20 kilowatts. Since the tube 100 rotates, a smaller cladding head 10 is permitted. The smallest tube size that can be clad using the present system is approximately 25 mm.

Further, in many cases the difference between bead heights is virtually immeasurable. The smoother finish provided by the vertical cladding characteristics, results in post-clad finishing time approximately ⅕ of that necessary with conventional processes. In many cases, virtually no post-clad finishing (i.e., "clean-up") is required to form a layer of uniform thickness.

Weld bead 31 is laid down in a continuous spiral with the subsequent layers of the bead moving upward along the interior of the tube-like structure 100. There is an overlap of between 30% and 50% from one layer to the next. It has been found that this spacing, when used in a vertical tube, creates a very uniform weld thickness throughout the length of the tube.

The smoother the finish of the cladding, the less time that is needed for post-clad grinding and polishing of the cladded product. The non-horizontal cladding process of the present invention results in a more even level of cladding so that the thickness of the clad 30 is relatively near to being uniform along the entire length of the clad. This means that far less "clean up" (making the thickness of the clad uniform) is required with the present invention. This "clean-up" process is normally more problematical than simply polishing the clad to a smooth finish. As a result of even cladding thickness, the overall process of the present invention is rendered more efficient and substantially less expensive.

Laser beam 20 is irradiated at an angle to the interior wall 101 of tube 100. This angle is preferably between 30° and 60° from perpendicular to the interior wall of the tube, with the laser head 2 above the point at which the clad bead 31 is being formed. Cladding powder to form the clad is dispensed from the cladding nozzle 3, which is also located above the clad.

The cladding process begins at the bottom of the tube 100. The original layer of cladding 31 can be supported using a form to support the cladding at the very end of tube. Subsequent beads or tiers 31 of cladding layer 30 are then formed on the upper side surface 32 of each lower tier or bead 31 of cladding layer 30.

An angle of between 30° and 60° above an axis perpendicular to the inner surface 101 of tube 100 provides a number of beneficial results. First, energy efficiency is enhanced since reflected irradiated energy is vastly reduced. Also, since there is no direct reflection of the irradiated laser beam 20 back into the laser head 2, damage to the laser head 2 or cladding nozzle 3 is avoided. Still further, the upper side surface 32 of cladding bead 31 creates a better arrangement for absorbing the energy of laser beam 20 to create a more efficient overall process.

The shelf-like upper surface 32 of cladding bead 31 creates a place to hold cladding powder from cladding powder nozzle 3. It is this powder that is melted by the energy from the laser beam 20 to form the next tier or cladding bead 31. Because upper side surface 32 of cladding bead 31 holds the powder, far less of it is lost, and far more of it is used to form the next cladding bead 31.

The present invention, in contrast to a horizontally positioned tube, utilizes more of the cladding powder and easily disposes of that powder which is not used, through the simple action of gravity. As a result, far less debris accumulates in the tube 100 during the cladding process.

Also, because the tube 100 is clad in a substantially vertical position, smoke is not held in the tube to turn into debris and contaminate the cladding layer 30. Rather, smoke can easily escape upwards through the upper open end of the tube 100. As a result, smoke contamination of subsequent cladding tiers (beads) is substantially eliminated.

The exhausting of smoke through the upper open end of the tube 100 also serves as a means for evacuating additional heat that is built up during the cladding process. When the tube is in the horizontal position, as is done with the cited conventional art, heat and smoke buildup can become a problem. This is avoided with the instant invention wherein heat is exhausted upwards with the smoke from the cladding process.

Figures 4, 5:
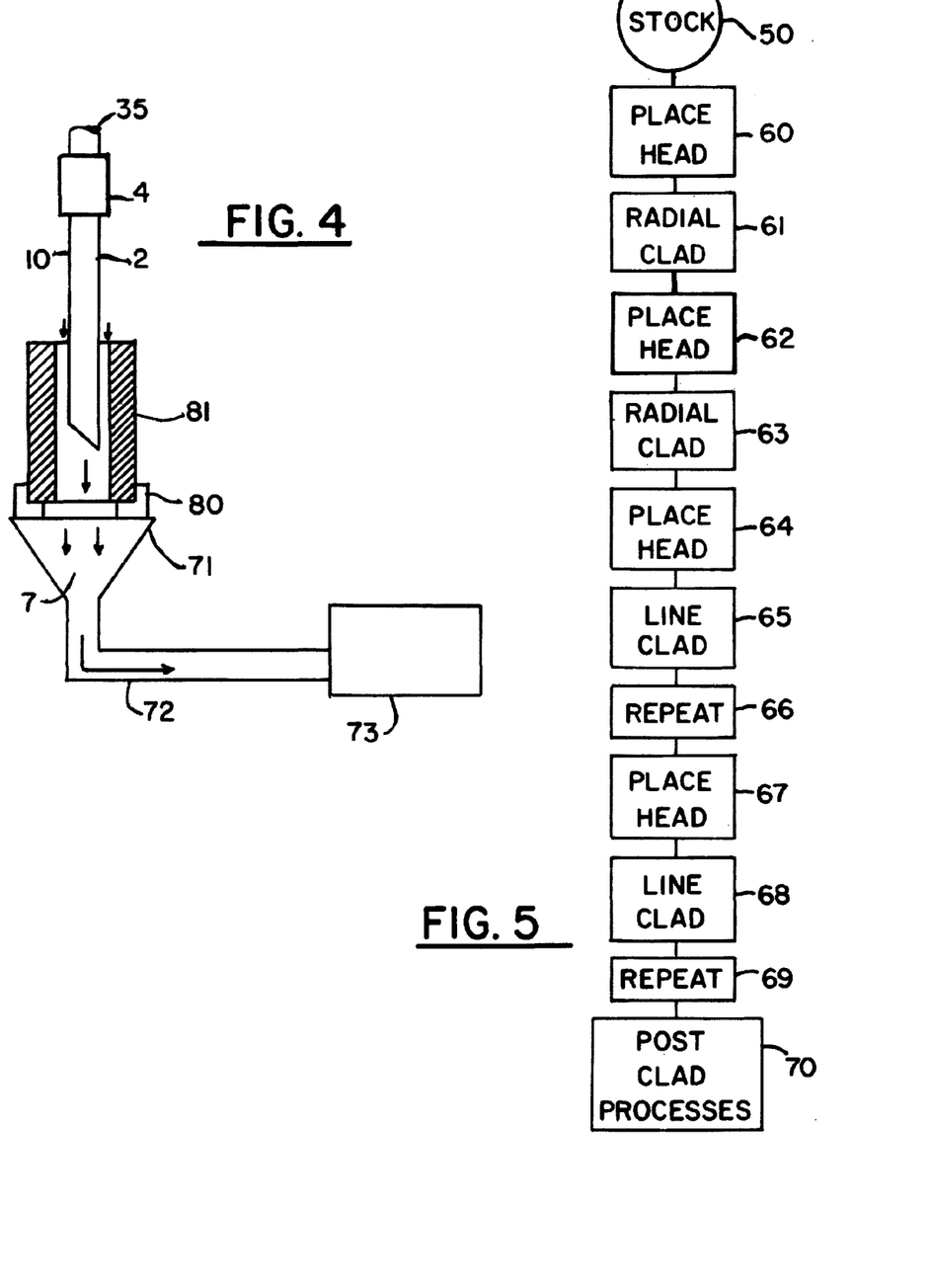
FIG. 4 is a schematic diagram showing an elevational side view of the present laser cladding system, including a downdraft subsystem to remove gas and particulate material.
FIG. 5 is a flow diagram depicting the steps used for conducting the cladding of a double barrel structure such as that depicted in FIG. 2(a).

In the alternative, a downdraft system 7 can be used to exhaust smoke and recover particulate matter such as the cladding powder. Such a system is depicted in FIG. 4. The system is mounted below a rotary table 80 that supports and moves the barrel being clad. A support cylinder 81 mounted to the rotary table 80 serves to support the barrel 100 (not shown in FIG. 4) being clad. The area beneath the support cylinder 81 and the rotary table 80 is encompassed by a funnel-like gathering portion 71 which is independently mounted near the rotary table 80. The entire area beneath the rotary table 80 is encompassed by the gathering portion 71 in order to contain and move all of the smoke and particulate matter from the cladding process. A vacuum pump and reclamation system 73 powers the downdraft system by pulling air from the top of the cylinder/barrel arrangement, down through the barrel/cylinder, past the rotary table 80 and into the gathering portion 71. From the gathering portion 71, the vacuum pump draws both smoke and particulate matter through airflow tube 72 into a reclamation system that is associated with the vacuum pump.

The major advantage of the downdraft system 7 of FIG. 4 is that there is little chance for relatively heavy fumes to linger in the barrel 100 being clad before eventually rising to the top of the barrel. Removal of undesirable fumes, smoke and particulate material is facilitated and made far more efficient by the downdraft system. Further, the downdraft system is capable of gathering unused cladding powder so that it can be reused in other operations. The results of using the downdraft system is that the cladded surface remains cleaner, cladding time is minimized, the process is less expensive because of recycled cladding material, and the overall environment near the cladding system can be kept much cleaner.

The fact that the tube 100 rotates rather than cladding head 10, means that a much smaller laser cladding head 10 can be used. This means that the system can accommodate smaller inner tube diameters, down to 25 mm, than can be accommodated conventionally. Further, the use of the shelf created by upper cladding surface 32 facilitates more uniform cladding beads 31 from tier to tier. As a result, far less post-clad machining or polishing is required. This is especially important with tubes for plasticating barrels having relatively small inner diameters.

While it is known to clad the interior of tubes to repair them in existing installations, such as boilers, the conventional art does not disclose systems where the vertical tube is spun, and where the upper end of the tube is open. As a result, the advantages obtained with the present invention cannot be found in any of the conventional systems.

Figure 2A:
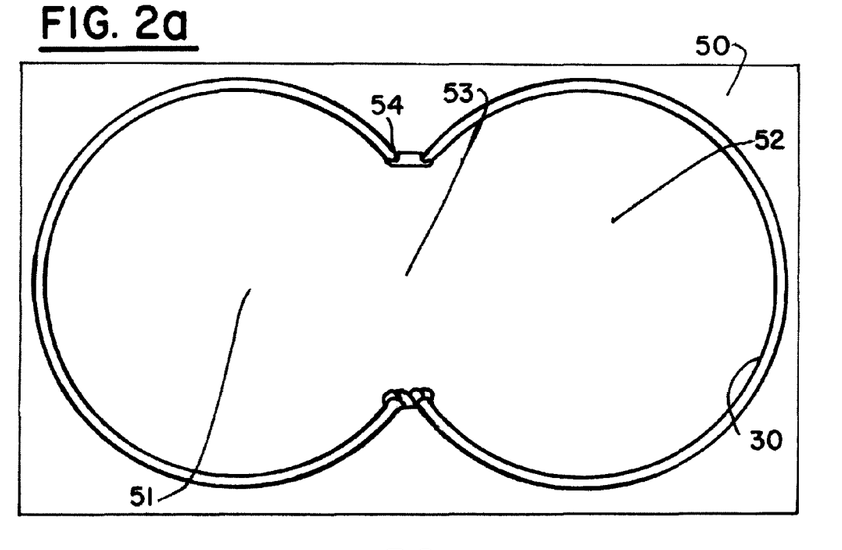
FIG. 2(a) is a top view schematic diagram depicting a double-bore barrel structure constituting an embodiment of the present invention.
Figure 2B:
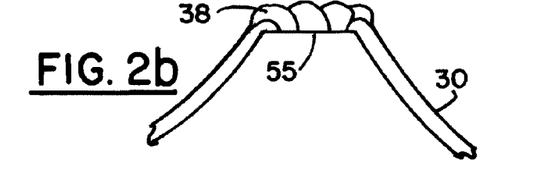
FIG. 2(b) is an enlarged sectional view of the schematic diagram shown in FIG. 2(a) depicting an interface in the double-bore barrel structure.

Another advantage of the present invention is found when cladding a structure such as that depicted in FIGS. 2(*a*) and 2(*b*). Double bore plasticating barrels are highly desirable, but are very difficult to manufacture conventionally. Traditionally, two pieces of stock are bored with a cutting machine. Then each is cut so that it can be welded to the other in the "figure-eight" pattern as depicted in FIG. 2(*a*). Once the two pieces of stock are welded together, the double barreled structure is then lined. Normally, this is accomplished by metal sleeve inserts, which are brazed (using a variety of different techniques) to hold them to the stock material.

Conventional double bore barrels are very expensive, and somewhat unstable. Further, a conventional brazed lining is unsuitable for certain uses. The present invention corrects this situation. In particular, with the present invention, bores 51, 52 are formed (preferably by drilling) in a single piece of stock 50 so that the pieces of stock do not have to be welded back together. The double bore structure can be rotated in a vertical position, and cladded from bottom to top in a manner similar to that previously described with respect to a single tube or barrel 100.

To clad stock 50, the cladding head 10 is inserted into each of the bores 51, 52 and the piece of stock 50 rotated. The software which controls the movement of the cladding head (10 in FIG. 1), in conjunction with the rotation of the stock 50, can be modified so that cladding does not occur in the open space 53 between the two bores 51, 52. This is an easy software modification and only differs from the software used to direct the cladding of a single bore, in that cladding is stopped during a certain portion of the rotation of the stock piece. In this manner, the conventionally difficult double barrel arrangement can be made almost as easily as a single barrel arrangement. Further, the direct cladding of the stock surface provides a more desirable product than the conventional insertion of a separate metal liner, which must be brazed.

The flow diagram of FIG. 5 depicts the manufacturing steps that are carried out when creating a laser-cladded double barreled structure. The first part of this process is to provide stock 50 with overlapping double barrels, as depicted in FIG. 2(*a*). The double barrel stock 50 is placed on the rotary table 80 or turning mechanism (depicted in FIG. 4) in such a position so that the laser cladding head 10 can be moved directly up the center of a first bore (step 60). The first bore is then radially clad in a manner similar to that previously described with closed tubes (step 61). The difference is that the software controlling the laser cladding operation is adjusted so that the operation does not take place at the intersection space 53 between the two bores 51, 52. The rest of the cladding operation is the same as previously described.

At step 62, the double bore stock 50 is adjusted on the rotary table or turning mechanism so that the cladding head is now in the center of the second bore 80. In the alternative, the second bore can be moved to a different position on the rotary table. At step 63, the second semi-cylindrical interior surface is clad in the same manner as was done with the first bore at step 61. As always, the cladding process takes place with the cladding head 10 moving from a lower position to a higher position along the surface to be clad.

Once the radial cladding of the two semi-cylindrical surfaces of each bore 51, 52 is concluded, the apices 54, 55, where the two bores come together, are addressed. The cladding head 10 is again repositioned (step 64). The first interfacing apex receives a series of linear clads 33 from bottom to top (step 65). The linear welds 33 are repeated until the apex is fully covered and the cladding extends over the radial claddings (step 66).

The cladding head 10 is then repositioned to the second apex (step 67). The linear cladding is then carried out (step 68) and repeated (step 69) until the apex is fully cladded. Usually, the linear welding at the apices will require two to five cladding passes for each. The linear clads are carried out in a continuous manner so that each weld 33 is a continuous line from the top to the bottom of the apex of the barrel. The linear clads overlap with each other from between 25% and 75% of the width of the weld.

A major advantage of the present invention is that old tubes or bores that had been previously coated, brazed, or provided with chemical surface treatments, can be cladded using the process of the present invention. Thus, a previously bored and lined piece of tubing can be subjected to the process of the present invention to be provided with a cladded (metallurgical) bond between lining material and the substrate stock. By refurbishing a previously manufactured and lined barrel, substantial savings can be made, and refurbishing becomes economically practical.

A major issue in cladding technology is the control of the heat. Laser cladding is already well known for solving many of the heat problems inherent to conventional (non-laser) cladding, as previously described. Heating with a laser is very intense and localized. As a result, both rapid heating and cooling are facilitated, and in many cases, preheating of the work piece is entirely unnecessary. However, over-rapid cooling of the piece may cause the clad to crack. This can be especially prevalent with the rapid cooling caused by the chimney effect of the open upper end of the vertical tube. The characteristics of the present invention facilitate rapid cooling of the cladded surface and thus, lead to the problem of clad cracking. This could render the entire cladded barrel to be useless, and constitute a waste of time and resources, despite the present system's higher efficiency over conventional arrangements.

An additional embodiment of the present invention addresses this drawback by using induction heaters arranged around the vertically aligned tube or barrel 100. Induction heating does not complicate the overall process despite the barrel rotating during the cladding. In the present invention, the induction heaters can be used before, during and after the cladding process takes place. Such heating can be used to lengthen the cooling time and thereby avoid clad cracking. Induction heaters are particularly efficient since they can penetrate from the outside and away from the tube or barrel 100 while still providing substantial heat to the its interior where the cladding bead 31 has been formed by laser cladding.

Figure 3:
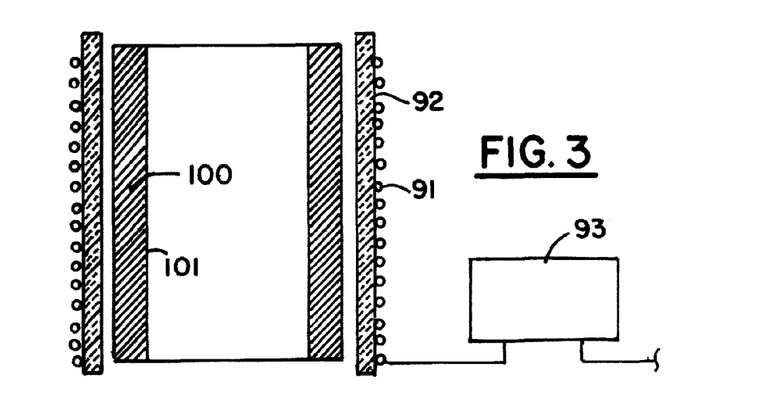
FIG. 3 is an elevational sectional view of the system of the present invention, depicting the relationship of the induction heating coil to a single-bore barrel embodiment being clad.

FIG. 3 depicts one arrangement of induction heaters mounted to assist in the laser cladding operation of a barrel. The induction heating system can be permanent or temporary. In either case, the windings 91 of the induction heater are arranged around an insulating layer 92 which surrounds the rest of the cladding system. This can include a stationary arrangement around the rotating table 80 or the support cylinder 81 (both depicted in FIG. 4), but is not necessarily required. All that matters is that the heat be conveyed efficiently to the tube or barrel 100 being clad.

The power supply 93 is sized to provide sufficient power to heat the barrel 100 in a pre-heating operation up to 1300° F. The pre-heat of the barrel being clad is done in order to prevent cracking of the clad. Further, many of the alloys used in cladding cool too fast, creating tension inside the cladding that can result in a crack. The pre-heating process (along with post-clad heating) permits a slower cooling process. The induction heater can be maintained at any suitable level in order to control the cool down period, from two hours to two days. Also, insulating blankets (not shown) can be used to further control the cool down period. The induction heating system permits the use of various types of insulation without complications to the overall system. It should be noted that the insulation 92 is also important to protect the plastic-coated induction coil. Such insulation is also useful to help control the cool down period of the cladded barrel. At the same time, the insulation prevents transmission of excessive heat from the cladded barrel to the coils of the induction heating system and the environment surrounding the cladding system.

The induction heaters 91 can be mounted in virtually any configuration around the vertical tube 100 that allows the interior of the tube 100 to be heated. Such configurations are already well known in the art of induction heating. However, induction heating has not previously been applied to a spinning vertical tube 100 to slow down the cooling process. Examples of a vertical cladding arrangement of the present invention with a surrounding induction heater are found in the photographs of the attached Appendix.

While the tube in the Appendix is relatively limited in length, it should be understand that the present system is capable of cladding tubes 20 feet in length. It should also be understood that the present invention is not confined to the system depicted in the attached photographs of the Appendix. Rather, the present invention can accommodate a wide variety of tube sizes and materials.

The advantages of the present invention are considerable. Each detail of the present invention contributes to the overall unexpected results and operational superiority. For example, waste of expensive cladding powder is reduced anywhere from 25% to 50% using the arrangement of the present invention. Further, contamination by cladding debris is reduced by almost 100%. Cladding time is decreased substantially in comparison to all well known cladding systems and arrangements. Further, all of this can be done for the smallest inside diameter tubes (down to 14 mm) used in plasticating barrels.

Preferably, the tubes, or tube-like structures 100, are mounted in a vertical position for cladding, and the cladding head 10 moves linearly from the bottom of the tube to the top. Very little in the way of special rotating arrangements are required. Once the teachings of the present invention are known, any number of different mechanical arrangements 80 can be used to rotate the tube in a vertical position. Examples are found in the Appendix. As such, further descriptions of these various arrangements are not necessary for an understanding of the present invention.

The vertical arrangement also permits a more accurate disposition of anti-abrasive material, which should be kept near the surface of the cladding 30. As with the cladding powder, waste of this anti-abrasive material is minimized, as is the possibility of pollution by those particles not being held by the clad. As a result, more of the anti-abrasive material is used and a greater percentage of it remains near the surface of the cladding 30. The placement of the anti-abrasive material near the surface of the clad (rather than deeper in the body of the clad) means that far less clad material must be machined or polished down to expose the anti-abrasive material. As a result, overall manufacturing time and expense is reduced.

The present invention permits reduced processing times due to the characteristics of laser cladding, high speed tube rotation, and the aforementioned advantages of vertical tube positioning. The drawbacks of rapid cooling are also addressed using inexpensive auxiliary induction heaters (FIG. 3). As a result, the cooling time can be precisely controlled so as not to negate all of the advantages of the rapid cooling facilitated by the present system. Time savings is also facilitated by the placement of anti-abrasion particles closer to the surface of the clad, thereby requiring less post-clad machining and polishing to expose the anti-abrasion particles.

Further, the present invention can be modified so that the cladding head 10 rotates rather than the tube 11. However, the drawbacks of doing this are well-known, so that this arrangement is preferable only for larger tube diameters. Nonetheless, many of the advantages of the vertical arrangement, including less post-clad polishing, less waste of cladding powder and anti-abrasive material, less contamination from loose cladding powder; and, more efficient use of all the materials involved, can be achieved, even with a stationary vertical tube.

Still further, a variety of different cladding heads can be used within the concept of the present invention, in particular the vertical arrangement of the tube. Examples are provided in the Applicants' earlier patent (i.e., U.S. Pat. No. 6,482,432 to Colby et al.), already incorporated herein by reference. Accordingly, an omni-directional cladding arrangement, or a spinning cladding head, can be used within the concept of the present invention. Further, while the present invention is particularly effective for reducing the loss of cladding powder or its contamination of other clad sites, a cladding wire can be used effectively within the concept of the present invention. Any waste will drop to the bottom of the tube away from all the cladding sites and the smoke generated from the cladding process will be exhausted out of the top of the tube.

While one of the preferred embodiments of the present invention has been directed to the lining of a steel (or steel alloy) plasticating barrel, other metal tubes, or tube-like structures, can be lined using the various embodiments or any combination thereof of the previously-described invention. Also, other metallic materials can be lined using the techniques of the present invention in any number of variations of the preferred embodiments described herein. The lining material need not be a particular type. Rather, a wide range of materials can be used as is appropriate with the substrate, and the application of the final product.

While the present invention is particularly effective for an improved technique for lining the metal tubes, other, non-cylindrical interior surfaces can be lined by the techniques of the present invention. A variety of different shapes are applicable to the cladding operation of the present invention. For example, irregular interior and exterior surfaces can be clad using the laser head 2. For such operations, it is necessary such that the laser head be moveable. More specifically, because the angle of the laser beam can be adjusted (between 30° and 60° from perpendicular), it is possible to adjust the radiation angle during the cladding process to address irregular surfaces. All that need be done is that the movement of the head be controlled using the software that would normally control the laser head 2 while the tube is spinning as described in the process of the first embodiment of the present invention. Irregular surfaces, such as the double-bore of FIG. 2 can be rotated to achieve the advantages thereof.

While a number of the preferred embodiments of the present invention are directed to vertical cladding, in which the structure to be cladded is held in a vertical position, other angled orientations are possible. For example, the tube can be rotated at a 45° angle with respect to horizontal to achieve much of the same benefit previously described with regard to the present invention. Based on such factors as the cladding materials, rotational speeds, cladding thickness and tube diameter, a wide range of different orientation angles "off horizontal" can be used within the concept of the present invention.

As a finally note, laser cladding is particularly useful in regards to repairing chrome-plated surfaces. There are a wide variety of surfaces, both interior and exterior, that are subject to chrome plating. Some examples include firearms and hydraulic cylinders (such as those used for aircraft landing gears). However, applications for chrome plating are not limited to these examples.

While a number of embodiments and variations have been made by way of example, the present invention is not to be limited thereby. Rather, the present invention should be construed to include any and all modifications, permutations, variations, adaptations and embodiments that would occur to one skilled in this technology once taught the present invention by this application. Accordingly, the present invention should be considered as being limited only by the following claims.

We claim:

1. A method of cladding an interior surface of a tube constituted as a first metallic material, using a laser welding head having a nozzle to apply a second metallic material constituted as a loose powder with carbide particles to the interior surface, said method comprising the steps of:
   a) preheating the tube before cladding;
   b) aligning the tube in a substantially vertical position;
   c) placing the laser welding head within the tube in a manner that permits rotation between the tube and the laser welding head;
   d) initiating rotation between the tube and the laser welding head;
   e) irradiating the interior surface of the tube with the laser welding head and placing the loose powder with carbide particles into the tube to form a weld bead of said second metallic material at the interior surface of the tube, said weld bead having an upper clad shelf surface extending outward from the interior surface of the tube;
   f) moving the laser welding head upwards to stay above the weld bead;
   g) placing the loose powder with carbide particles onto the upper clad shelf surface of a previously irradiated, existing clad portion of the weld bead by dispensing through said nozzle;
   h) continuing rotation between the tube and said laser welding head to expand the weld bead around the interior surface of the tube by forming newly irradiated clad portions to extend from previously irradiated, existing clad portions while irradiating from above the weld bead;
   i) repeating steps (f) through (h) until the interior surface of the tube is clad with the second metallic material; and,
   j) cooling over a predetermined amount of time after cladding the second metallic material to the interior surface to said tube to prevent cracking of the cladded second metallic material.

2. The method of claim 1, wherein the preheating step comprises heating the tube using an induction heater up to as much as 1300° F.

3. The method of claim 1, wherein a continuous spiral cladding bead is formed from a beginning point proximate a bottom opening of the tube and ending at a point proximate a top opening of the tube.

4. The method of claim 1, wherein adjacent weld bead clad portions overlapping between 30% and 50%.

5. The method of claim 1, wherein the cooling step includes using at least one of an induction heater and an insulating material, and the method further comprising the step of:
   k) drawing gasses and unused welding powder out of the tube from below the tube.

6. The method of claim 1, wherein irradiation from the laser weld head is originated from above the upper clad shelf surface of the weld bead at an angle between 30° and 60° with respect to a weld target point at the interior surface of the tube.

7. A method of cladding an interior surface of a double barrel structure constituted as a first metallic material, and including first and second overlapping cylindrical tubes formed in a single piece of substrate stock, using a laser welding head having a nozzle to apply a second metallic material constituted as a loose powder with carbide particles to the interior surface, the double barrel structure having first and second interfacing apices between the first and second cylindrical tubes, said method comprising the steps of:
   a) preheating the double barrel structure before cladding;
   b) aligning the double barrel structure in a substantially vertical position;
   c) placing a laser welding head within the first or second cylindrical tube of the double barrel structure in a manner that permits rotation between the respective cylindrical tube and the laser welding head;
   d) initiating rotation between the respective cylindrical tube and the laser welding head;
   e) irradiating the interior surface of the respective cylindrical tube with the laser welding head and placing the loose powder with carbide particles into the tube to form a weld bead of said second metallic material at the interior surface of the respective cylindrical tube, said weld bead having an upper clad shelf surface extending outward from the interior surface of the respective cylindrical tube;
   f) moving the laser welding head upwards to stay above the weld bead;
   g) placing the loose powder with carbide particles onto the upper clad shelf surface of a previously irradiated, existing clad portion of the weld bead by dispensing through said nozzle;
   h) continuing rotation between the respective cylindrical tube and laser welding head to expand the weld bead around a corresponding interior surface of said tube by forming newly irradiated clad portions to extend from previously irradiated, existing clad portions while irradiating from above the weld bead;
   i) repeating steps (f) through (h) until the interior surface of the respective cylindrical tube is clad with the second metallic material; and then, j) repeating steps (c) through (i) for cladding the interior surface of the other of the first or second cylindrical tube of the double barrel structure; and, k) cooling over a predetermined amount of time after cladding the second metallic material to the interior surface of said double barrel structure, to prevent cracking of the cladded second metallic material.

8. The method of claim 7, wherein the preheating step includes heating the double barrel structure using an induction heater up to as much as 1300° F., and the method further comprising the step of:

k) making a linear laser weld at each of the interfacing apices between the first and second overlapping cylindrical tubes.

9. The method of claim 7, wherein steps (e) and (h) further comprise stopping the irradiating as the laser welding head passes between the first and second interfacing apices between the first and second cylindrical tubes, and the cooling in step (k) includes using at least one of an induction heater and an insulating material.

* * * * *